(12) United States Patent
Campbell et al.

(10) Patent No.: US 12,220,894 B2
(45) Date of Patent: Feb. 11, 2025

(54) MULTILAYER COMPOSITE TUBE WITH FLAME-RESISTANT LAYERS

(71) Applicant: Titeflex Corporation, Springfield, MA (US)

(72) Inventors: Donald Bradley Campbell, Gallatin, TN (US); Jordan Strunk, Portland, TN (US)

(73) Assignee: Titeflex Corporation, Springfield, MA (US)

(*) Notice: Subject to any disclaimer, the term of this patent is extended or adjusted under 35 U.S.C. 154(b) by 0 days.

(21) Appl. No.: 17/150,107

(22) Filed: Jan. 15, 2021

(65) Prior Publication Data
US 2022/0032571 A1 Feb. 3, 2022

Related U.S. Application Data

(60) Provisional application No. 63/059,616, filed on Jul. 31, 2020.

(51) Int. Cl.
*B32B 1/08* (2006.01)
*B32B 7/12* (2006.01)
(Continued)

(52) U.S. Cl.
CPC ............... *B32B 1/08* (2013.01); *B32B 7/12* (2013.01); *B32B 15/20* (2013.01); *B32B 27/20* (2013.01);
(Continued)

(58) Field of Classification Search
CPC ............... B32B 1/08; B32B 2597/00; B32B 2250/05; B32B 2255/10; B32B 2311/24;
(Continued)

(56) References Cited

U.S. PATENT DOCUMENTS

| 3,782,452 A | 1/1974 | Ceplon |
| 4,370,186 A | 1/1983 | Blandin et al. |

(Continued)

FOREIGN PATENT DOCUMENTS

| CN | 202118391 U | 1/2012 |
| CN | 203286158 U | 11/2013 |

(Continued)

OTHER PUBLICATIONS

Standard Specification for PE-RT/AL/PE-RT composite pressure pipe (published Jun. 2019).*

(Continued)

*Primary Examiner* — Yan Lan
(74) *Attorney, Agent, or Firm* — Saul Ewing LLP; Brian R. Landry

(57) ABSTRACT

One aspect of the invention provides a composite refrigeration line set including: a suction line and a return line. One or more of the lines are a composite refrigeration line set tube including: an inner plastic tube; a first adhesive layer external to the inner plastic tube; an aluminum layer surrounding the first adhesive layer and coupled to the inner plastic tube via the first adhesive layer; a second adhesive layer external to the aluminum layer; and an outer plastic layer surrounding the aluminum layer and coupled to the aluminum layer via the second adhesive layer. The outer plastic tube includes a flame-resistant compound combined with PERT. The composite refrigeration line set tube has a flame and smoke spread rating of no more than 25/50 when tested in isolation using Appendix A1.22 of the CAN/ULC-S102-10 Standard Test Method for Surface Burning Characteristics of Building Materials and Assemblies.

15 Claims, 7 Drawing Sheets

(51) Int. Cl.
  *B32B 15/20* (2006.01)
  *B32B 27/20* (2006.01)
  *B32B 27/32* (2006.01)
  *F28F 1/00* (2006.01)

(52) U.S. Cl.
  CPC .............. *B32B 27/32* (2013.01); *F28F 1/003* (2013.01); *B32B 2250/03* (2013.01); *B32B 2262/101* (2013.01); *B32B 2264/1027* (2020.08); *B32B 2264/301* (2020.08); *B32B 2307/3065* (2013.01); *B32B 2311/24* (2013.01); *B32B 2323/04* (2013.01); *B32B 2597/00* (2013.01)

(58) Field of Classification Search
  CPC ............... B32B 15/20; B32B 2250/03; B32B 2262/101; B32B 2264/1027; B32B 2264/301; B32B 2307/3065; B32B 2323/04; B32B 27/20; B32B 27/32; B32B 7/12; F16L 11/08; F16L 9/147; F28F 1/003
  See application file for complete search history.

(56) References Cited

U.S. PATENT DOCUMENTS

| | | |
|---|---|---|
| 4,531,552 A | 7/1985 | Kim |
| 4,614,208 A | 9/1986 | Skarelius |
| 4,758,455 A | 7/1988 | Campbell et al. |
| 4,842,024 A | 6/1989 | Palinchak |
| 4,881,576 A | 11/1989 | Kitami et al. |
| 4,911,778 A | 3/1990 | Barnoach |
| 4,941,437 A | 7/1990 | Suzuki et al. |
| 4,999,903 A | 3/1991 | Bujes |
| 5,009,262 A | 4/1991 | Halstead et al. |
| 5,580,405 A | 12/1996 | Palmer |
| 6,050,301 A | 4/2000 | Yoshida et al. |
| 6,074,717 A | 6/2000 | Little et al. |
| 6,142,707 A | 11/2000 | Bass |
| 6,213,157 B1 | 4/2001 | Thiebaud et al. |
| 6,237,641 B1 | 5/2001 | Niki et al. |
| 6,293,311 B1 | 9/2001 | Bushi et al. |
| 6,328,075 B1 | 12/2001 | Furuta et al. |
| 6,401,761 B1 | 6/2002 | Katayama et al. |
| 6,546,963 B2 | 4/2003 | Nuss |
| 6,604,552 B2 | 8/2003 | Hansen et al. |
| 6,652,939 B2 | 11/2003 | Smith et al. |
| 6,685,872 B2 | 2/2004 | Dooley et al. |
| 6,742,576 B2 | 6/2004 | Bergevin |
| 6,822,023 B2 * | 11/2004 | Stuart .................... C08J 9/0028 521/60 |
| 6,926,040 B1 | 8/2005 | Prescott et al. |
| 7,055,553 B2 | 6/2006 | Bessette et al. |
| 7,250,473 B2 | 7/2007 | Schramm et al. |
| 7,316,246 B2 | 1/2008 | Hayton |
| 7,478,654 B2 | 1/2009 | Haines |
| 7,635,008 B2 | 12/2009 | Follett et al. |
| 7,644,736 B2 | 1/2010 | Bittenbender et al. |
| 7,857,010 B1 | 12/2010 | Davidson |
| 7,913,719 B2 | 3/2011 | Werner et al. |
| 8,101,687 B2 | 1/2012 | Schramm et al. |
| 8,197,947 B2 | 6/2012 | Botros et al. |
| 8,365,568 B2 | 2/2013 | Biris et al. |
| 8,470,423 B2 | 6/2013 | Jarvenkyla |
| 8,651,148 B2 | 2/2014 | Jespersen |
| 8,714,203 B2 | 5/2014 | Theis |
| 8,800,604 B2 | 8/2014 | Sont et al. |
| 8,944,113 B2 | 2/2015 | Shafer et al. |
| 8,955,552 B2 | 2/2015 | Nanney et al. |
| 9,068,061 B2 | 6/2015 | Hoerold et al. |
| 9,234,610 B2 | 1/2016 | Baxi et al. |
| 9,429,256 B2 | 8/2016 | Baccaro et al. |
| 9,759,355 B2 | 9/2017 | Daugherty et al. |
| 9,937,527 B2 | 4/2018 | Ericsson et al. |
| 9,968,017 B2 | 5/2018 | Yamasaki et al. |
| 10,151,418 B2 | 12/2018 | Colcombet |
| 10,160,580 B2 | 12/2018 | Suter et al. |
| 10,197,208 B2 | 2/2019 | Jan et al. |
| 10,392,496 B2 | 8/2019 | Ericsson et al. |
| 10,544,886 B2 | 1/2020 | Sanni et al. |
| 2002/0023447 A1* | 2/2002 | Podtchereniaev ...... F25B 41/22 62/217 |
| 2002/0056284 A1 | 5/2002 | Nobuta |
| 2003/0049400 A1 | 3/2003 | Smith et al. |
| 2003/0075226 A1 | 4/2003 | Codling et al. |
| 2003/0127147 A1 | 7/2003 | Van Dam et al. |
| 2004/0061091 A1* | 4/2004 | Tieken .................... C09K 5/045 252/67 |
| 2004/0182463 A1 | 9/2004 | Bessette et al. |
| 2006/0106139 A1 | 5/2006 | Kosaka et al. |
| 2006/0272727 A1 | 12/2006 | Dinon et al. |
| 2007/0200342 A1 | 8/2007 | Roberts-Moore et al. |
| 2008/0036198 A1 | 2/2008 | Roberts-Moore et al. |
| 2008/0053553 A1 | 3/2008 | Doshi |
| 2009/0038704 A1 | 2/2009 | Sausner et al. |
| 2010/0101292 A1 | 4/2010 | Biris et al. |
| 2010/0107682 A1 | 5/2010 | Cartheuser |
| 2010/0221473 A1 | 9/2010 | Biris |
| 2011/0100497 A1 | 5/2011 | Stette |
| 2012/0091144 A1 | 4/2012 | Baumgartner et al. |
| 2013/0126032 A1 | 5/2013 | Bassi et al. |
| 2013/0312865 A1 | 11/2013 | Baur et al. |
| 2014/0096857 A1 | 4/2014 | Humalainen |
| 2014/0144538 A1 | 5/2014 | Sillasen et al. |
| 2014/0373954 A1 | 12/2014 | Smith |
| 2015/0090360 A1 | 4/2015 | Carlay, II |
| 2015/0226440 A1* | 8/2015 | Lipinski ................ F24F 5/0089 165/47 |
| 2017/0038091 A1 | 2/2017 | Campbell et al. |
| 2017/0146157 A1 | 5/2017 | Carlay et al. |
| 2017/0335997 A1 | 11/2017 | Rappitsch et al. |
| 2018/0202583 A1 | 7/2018 | Rimal |
| 2018/0327179 A1* | 11/2018 | Papas .................... B65D 90/008 |
| 2019/0017646 A1 | 1/2019 | Roseen |
| 2020/0166238 A1 | 5/2020 | Campbell et al. |
| 2021/0404588 A1 | 12/2021 | Wolf |

FOREIGN PATENT DOCUMENTS

| | | |
|---|---|---|
| CN | 105736844 A | 7/2016 |
| CN | 205479762 U | 8/2016 |
| CN | 107096991 A | 8/2017 |
| DE | 202019101108.4 U1 | 5/2020 |
| EP | 1801536 A1 | 6/2007 |
| EP | 2043856 | 1/2012 |
| EP | 2520423 A1 | 11/2012 |
| EP | 2899471 * | 2/2017 |
| EP | 3421905 A1 | 1/2019 |
| EP | 3422402 A1 | 1/2019 |
| JP | S57203538 A | 12/1982 |
| JP | 2001241572 A | 9/2001 |
| JP | 2005172168 A | 6/2005 |
| JP | 3700448 B2 | 7/2005 |
| JP | 2007205507 A | 8/2007 |
| KR | 20140125618 A | 10/2014 |
| WO | 2008013829 A2 | 1/2008 |
| WO | 2009146993 A1 | 12/2009 |
| WO | 2013165452 A1 | 11/2013 |
| WO | 2014144522 A1 | 9/2014 |
| WO | 2017095542 A1 | 6/2017 |
| WO | 2019022076 A1 | 1/2019 |

OTHER PUBLICATIONS

Air conditioning faces flammable future—Cooling Post, https://www.coolingpost.com/world-news/air-conditioning-faces-flamma . . . , Feb. 18, 2017, 6 pages.

An American National Standard, Designation: 84-07, "Standard Test Method for Surface Burning Characteristics of Building Materials", Mar. 2007, 21 pages.

(56) References Cited

OTHER PUBLICATIONS

ASHRAE Guideline 38-2018, "Guideline for Using Metal Pressure Vessels to Test Materials Used in Refrigeration Systems", 2018, 12 pages.
ASHRAE, ANSI/ASHRAE Standard 15-2019, "Safety Standard for Refrigeration Systems", 2019, 100 pages.
ASTM International Standard Specification for Polyethylene/Aluminum/Polyethylene (PE-AL-PE) Composite Pressure Pipe, Apr. 2001, 9 pages.
Cable Insulation and Jacketing, DuPont Performance Polymers, https://www.dupont.com/transportation-industrial/high-performance-cabl . . . , downloaded Jun. 4, 2020, 6 pages.
Chemeon Surface Technology, "Chemeon Pretreatment & Conversion Coating for Magnesium Alloys", 2015, 4 pages.
Detlef Schramm & Mark Jeruzal, PE-RT, "A New Class of Polyethylene for Industrial Pipes", downloaded Dec. 31, 2019, 11 pages.
Multi-Flex Pipe Systems, LLC, "Multi-Flex", www.multiflexpipe.com, (file creation date=Oct. 27, 2015), 16 pages.
Multi-Flex Pipe Systems, LLC, "Multi-Flex, Installation Guide", (file creation date=Jun. 22, 2015), 61 pages.
Multi-Flex Pipe Systems, "Multi-Flex Pipe: The Next Generation HVAC/R Piping Solution", (file creation date=Apr. 27, 2015), 2 pages.
National Standard of Canada, CAN/UCL-S102-10, "Standard Method of Test for Surface Burning Characteristics of Building Materials and Assemblies", Jul. 2010, 50 pages.
Plastics Pipe Institute, "Pex-Aluminum-Pex Composite (Pex-Al-Pex)", downloaded Mar. 22, 2019, 4 pages.
SKZ Testing GmbH, Certificate, Mar. 9, 2016, 2 pages.
Standard Specification for Polyethylene of Raised Temperature/Aluminum/Polyethylene of Raised Temperature (PERT/AL/PE-RT) Composite Pressure Pipe, Designation: F3346-19, Jun. 2019, 10 pages.
UL 207, Standard for Safety, Refrigerant-Containing Components and Accessories, Nonelectrical, Jun. 13, 2014, 46 pages.
Wikipedia, "Cross-linked polyethylene", https://en.wikipedia.org/wiki/Cross-linked_polyethylene#PEX-AL-PEX, downloaded Mar. 22, 2019, 13 pages.
Wikipedia, "Emissivity", https://en.wikipedia.org/wiki/Emissivity, downloaded Mar. 20, 2020, 13 pages.
Wikipedia, "Hot-melt adhesive", https://en.wikipedia.org/wiki/Hot-melt_adhesive, downloaded Dec. 30, 2019, 12 pages.
Wikipedia, "Reflectance", https://en.wikipedia.org/wiki/Reflectance#Reflectivity, downloaded Mar. 20, 2020, 11 pages.
Gallagher , "Yoga Pipe ACR, The Next Generation of ACR Pipe", downloaded Nov. 28, 2019, 8 pages.
Han, C. D., et al., "Use of the Coextrusion Technique for Producing Flame-Retardant and Antistatic Fibers", Journal of Applied Polymer Science vol. 20, 1976, 2913-2918.
Hu, H., et al., "Corrosion and Surface Treatment of Magnesium Alloys", Intech, Open Science, Open Minds, 2014, 67-108.
Lehmann, K., "Designing With Polymers, Organomodified siloxanes, Improved fire protection", Elements 40:3, 2012, 6-12.
McLinden, M. O., et al., "Limited Options for low-global-warming-potential refrigerants", Nature Communications, Feb. 17, 2017, 9 pages.
International Search Report and Written Opinion, International Patent Application No. PCT/US2021/042993, dated Dec. 28, 2021.
Standard Specification for Polyethylene of Raised Temperature/Aluminum/Polyethylene of Raised Temperature 'PE-RT/AL/PE-RT) Composite Pressure Pipe based on Inner Diameter (ID) for use in Air Conditioning and Refrigeration Line Set Systems, Apr. 2021, 9 pages.
PMG Listing Criteria for PERT-AL-PERT Pipe and Fittings for Refrigeration Applications, Nov. 2015, 5 pages.
Search Report, Spanish Patent Application No. 202190055, Mar. 9, 2022.
Office Action, U.S. Appl. No. 16/931,571, filed Aug. 5, 2022.
"Examination Report, U.K. Application No. GB2109057.6", Jan. 13, 2023, 5 pages.
"First Office Action, Chinese Patent Application No. 2020800247370", Feb. 24, 2023.
"Office Action, U.S. Appl. No. 16/931,571", Feb. 16, 2023.
"Combined Search and Examination Report, United Kingdom Patent Application No. GB2303859.9", Apr. 20, 2023.
"Combined Search and Examination Report, United Kingdom Patent Application No. GB2303861.5", Apr. 28, 2023.
"Combined Search and Examination Report, United Kingdom Patent Application No. GB2303862.3", Apr. 25, 2023.
"Examination Report, United Kingdom Patent Application No. GB2109057.6", Apr. 19, 2023.
"Examination Report, United Kingdom Patent Application No. GB2109057.6", Jul. 21, 2022.
"Non-Final Office Action, U.S. Appl. No. 17/938,761", May 25, 2023.
"Examination Report under Section 18(3)", U.K. Patent Application No. GB2303861.5, Jul. 13, 2023.
"Intention to Grant", U.K. Patent Application No. GB2303859.9, Jul. 12, 2023.
"Intention to Grant", U.K. Patent Application No. GB2303862.3, Jul. 10, 2023.
"Search and Examination Report under Sections 17 and 18(3)", U.K. Patent Application No. GB2109057.6, Jul. 13, 2023.
"Examination Report under Section 18(3), U.K. Patent Application No. GB2109057.6", Aug. 24, 2023.
"Examination Report under Section 18(3), U.K. Patent Application No. GB2303861.5", Aug. 24, 2023.
"Second Office Action, Chinese Patent Application No. 2020800247370", Oct. 24, 2023.
"Examination Report under Section 18(3), U.K. Patent Application No. GB2303861.5", Nov. 30, 2023.
Requisition, Canadian Patent Application No. 3,134,061, May 22, 2024.
Decision of Rejection, Chinese Patent Application No. 2020800247370, Apr. 23, 2024.
Extended European Search Report, European Patent Application No. 21849189.2, May 31, 2024.
Office Action, U.S. Appl. No. 18/536,737, filed Sep. 24, 2024.

\* cited by examiner

MULTILAYER COMPOSITE TUBE WITH FLAME-RESISTANT LAYERS

CROSS-REFERENCE TO RELATED APPLICATIONS

This application claims the benefit of priority 35 U.S.C. § 119(e) to U.S. Provisional Patent Application Ser. No. 63/059,616, filed Jul. 31, 2020. The entire content of this application is hereby incorporated by reference herein.

BACKGROUND OF THE INVENTION

Multilayer composite tubes are designed and used to convey liquids, primarily water, for applications such as in floor heating, radiator heating, and water supply.

SUMMARY OF THE INVENTION

One aspect of the invention provides a composite refrigeration line set including: a suction line and a return line. One or more of the suction line and the return line are a composite refrigeration line set tube including: an inner plastic tube; a first adhesive layer external to the inner plastic tube; an aluminum layer circumferentially surrounding the first adhesive layer and coupled to the inner plastic tube via the first adhesive layer; a second adhesive layer external to the aluminum layer; and an outer plastic layer circumferentially surrounding the aluminum layer and coupled to the aluminum layer via the second adhesive layer. The inner plastic tube is polyethylene of raised temperature. The outer plastic tube is polyethylene of raised temperature. The outer plastic tube includes a flame-resistant compound combined with the polyethylene of raised temperature. The composite refrigeration line set tube has a flame and smoke spread rating of no more than 25/50 when tested in isolation using Appendix A1.22 of the CAN/ULC-S102-10 Standard Test Method for Surface Burning Characteristics of Building Materials and Assemblies.

This aspect of the invention can have a variety of embodiments. At least the aluminum layer can remain intact after completion of the CAN/ULC-S102-10 Standard Test Method for Surface Burning Characteristics of Building Materials and Assemblies.

The at least one flame-resistant compound can include one or more selected from the group consisting of: a flame retardant, glass fibers, nanoclay, nanofibers, and a combination thereof. The at least one flame-resistant compound can be a thermal foaming agent. The at least flame-resistant compound can have a specific gravity of greater than 1.5 with respect to the outer plastic tube.

The outer plastic layer can be composed of at least 50% by weight of the flame-resistant compound. The outer plastic layer can be composed of at least 90% by weight of the flame-resistant compound.

The at least one flame-resistant compound can include magnesium hydroxide.

Another aspect of the invention provides a refrigeration system including: a compressor; an evaporator coil; the composite refrigeration line set as described herein coupled between the compressor and the evaporator coil to form a fluid circuit between the compressor and the evaporator coil; and a refrigerant received within the fluid circuit.

This aspect of the invention can have a variety of embodiments. The refrigerant can be a flammable refrigerant. The refrigerant can be selected from Table 2. The refrigerant can include difluoromethane. The refrigerant can be R-32. The refrigerant can be R-454B. The refrigerant can be a low-global-warming-potential refrigerant. The refrigerant can be an A2L refrigerant.

Another aspect of the invention provides a refrigeration system including: a compressor; an evaporator coil; a first pair of compression fittings coupled to the compressor; a second pair of compression fittings coupled to the evaporator coil; a composite refrigeration line set coupled between the compressor and the evaporator coil via one of the compression fittings to form a fluid circuit between the compressor and the evaporator coil; and a refrigerant received within the fluid circuit. The composite refrigeration line includes: a suction line and a return line. Each of the compression fittings includes: a nipple; a ferrule; and a nut. The nipple includes: a distal annular channel; a distal O-ring received in the distal annular channel; a plurality of medial barbs; a proximal annular channel; a proximal O-ring received in the proximal annular channel; and a first threaded region. The ferrule is sized to fit over the nipple and compress a tubing end between the ferrule and the nipple. The nut includes: an axial bore sized to fit over the tubing end; a second threaded region complementary to the first threaded region of the nipple; and an internal geometry adapted and configured to apply compression to the ferrule when the nut is threaded proximally relative to the nipple. One or more of the suction line and the return line are a composite refrigeration line set tube including: an inner plastic tube; a first adhesive layer circumferentially surrounding the inner plastic tube; an aluminum layer circumferentially surrounding the first adhesive layer and coupled to the inner plastic tube via the first adhesive layer; a second adhesive layer circumferentially surrounding the aluminum layer; and an outer plastic layer circumferentially surrounding the aluminum layer coupled to the aluminum layer via the second adhesive layer. The inner plastic tube is polyethylene of raised temperature. The outer plastic tube is polyethylene of raised temperature. The aluminum layer is butt-welded to itself.

This aspect of the invention can have a variety of embodiments. The refrigeration system can be a heat pump.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DEFINITIONS

Figure 1:
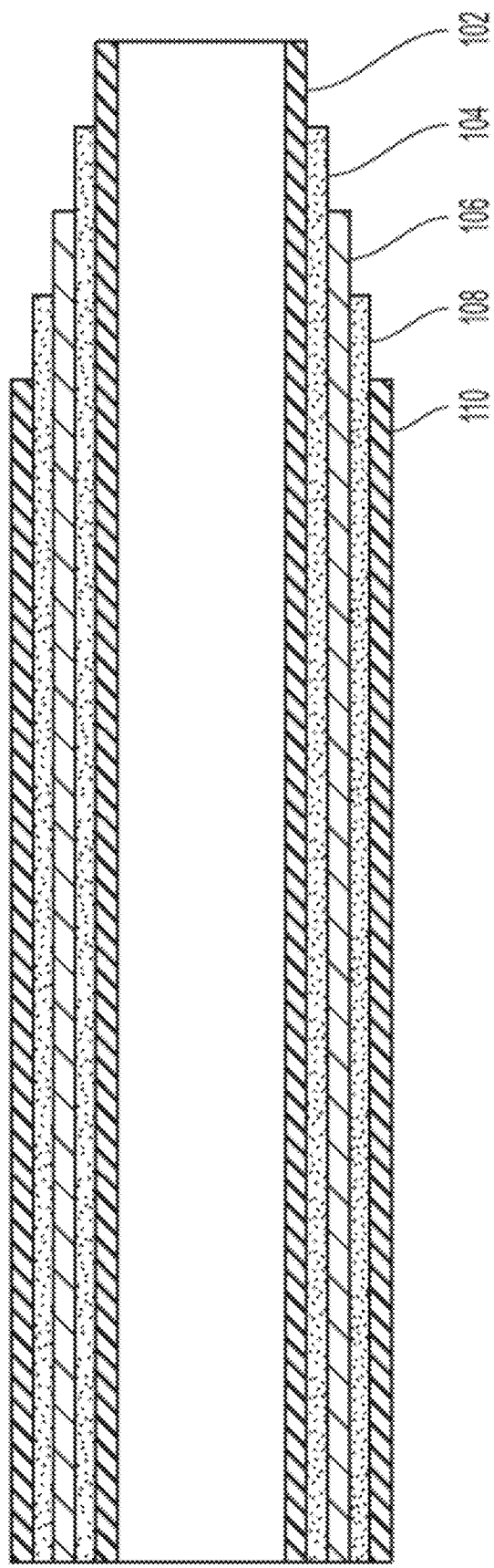
FIGS. 1 and 2 depict a plastic/gas-barrier/flame protective layer composite tube according to embodiments of the invention.

The instant invention is most clearly understood with reference to the following definitions:

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used herein, the term "alloy" refers to a homogenous mixture or metallic solid solution composed of two or more elements. Examples of alloys include austenitic nickel-chromium-based super-alloys (available, e.g., under the INCONEL® trademark from Huntington Alloys Corporation of Huntington, W. Va.), brass, bronze, steel, low carbon steel, phosphor bronze, stainless steel, and the like.

As used in the specification and claims, the terms "comprises," "comprising," "containing," "having," and the like can have the meaning ascribed to them in U.S. patent law and can mean "includes," "including," and the like.

As used in the specification and claims, the term "fiberglass" refers to fiber-reinforced plastic using glass fiber. Generally speaking, "E-glass" is understood to refer to alumina-calcium-borosilicate glasses used as a general purpose reinforcement where strength and high electrical resistivity are desired, while "S-glass" is understood to refer to magnesium aluminosilicate glasses used for textile substrates or reinforcement in composite structural applications that require high strength, modulus, and durability under conditions of extreme temperature or corrosive environments.

Unless specifically stated or obvious from context, the term "or," as used herein, is understood to be inclusive.

As used herein, the term "metal" refers to any chemical element that is a good conductor of electricity and/or heat, and alloys thereof. Examples of metals include, but are not limited to, aluminum, cadmium, niobium (also known as "columbium"), copper, gold, iron, nickel, platinum, silver, tantalum, tin, titanium, zinc, zirconium, and the like.

As used herein, the term "resin" refers to any synthetic or naturally occurring polymer. Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Multilayer composite tubes with flame protection layers are described herein. A layer of the composite tube can be a flame protective layer. In some cases, the flame protective layer can be an extruded polymer layer loaded with flame retardants, glass fibers, nanoclays, nanofibers, and the like. The flame protective layer can form a complete or substantially complete layer of char when exposed to flame, thereby preventing the flame from penetrating other layers of the composite tube.

Multilayer composite tubes can be fabricated from multiple layers of material including various plastics, adhesives and, in some cases metal layers. Exemplary constructions include are summarized below.

TABLE 1

Exemplary Multilayer Composite Pipe Constructions

| Short Name | Components |
| --- | --- |
| PE/AL/PE | Polyethylene/Aluminum/Polyethylene |
| PEX/AL/PEX | Cross-linked Polyethylene/Aluminum/Cross-linked Polyethylene |
| PERT/AL/PERT | Polyethylene of raised temperature/Aluminum/Polyethylene of raised temperature |

A variety of multilayer composite tubes and applications for the same are described in U.S. Patent Application Publication No. 2020/0400251.

Referring to FIG. 1, these constructions can include an inner layer of a type of plastic 102, a layer of adhesive 104, a gas (e.g., oxygen) barrier (e.g., a layer of aluminum) 106, a layer of adhesive 108, and a flame protective layer 110.

The inner plastic layer 102 can be selected from a variety of materials such as thermoplastics, thermoplastic elastomers, polyethylene, polyethylene, polypropylene, polyvinyl chloride (PVC), polyamide, fluoropolymers, polyvinylidene fluoride (PVDF), fluorinated ethylene propylene (FEP), perfluroalkoxy alkane (PFA), and the like.

The gas barrier 106 can be a metallic composition. For example, the gas barrier 106 can be aluminum, steel, copper, and the like. Aluminum may include beneficial properties for the gas barrier 106, such as reduced weight, anti-corrosiveness, manufacturing cost, and the like.

The flame protective layer 110 can include flame resistant material within the layer's composition. For example, the flame protective layer 110 can include flame retardants (e.g., magnesium hydroxide, aluminum trihydrate, and/or halogenated fire retardants), glass fibers, nanoclays, nanofibers, and the like. Further, the flame protective layer 110 can also include a plastic component, similar to the plastic layer 102 discussed above. For example, the plastic component can include one or a combination of thermoplastics, thermoplastic elastomers, polyethylene, polyethylene, polypropylene, PVC, polyamide, fluoropolymers, PVDF, FEP, PFA, and the like. For example, the flame protective layer 110 can be solution or suspension in which a polymer is the dispersion medium and the flame retardant is dissolved or dispersed within the polymer or adhered to the polymer.

The flame protective material of the layer 110 can be highly loaded. For example, the filler loading for the flame protective material can be 50-90% by weight of the layer 110. In some cases, the specific gravity for the flame protective material can be greater than 1.5. In some cases, thermal foaming agents can also be a component of the layer 110, which can increase the char volume of the layer 110 when exposed to flame.

In some cases, the composite tube can undergo extrusion procedures for formation. For example, the flame protective layer 110 can be extruded to form the shape necessary for the tube. In some cases, the flame protective materials and the plastic components of the layer 110 can be extruded together, thereby forming the layer 110. In some cases, the layer 110 can undergo tandem extrusion or co-extrusion with other layers of the composite tube. For example, the layer 110 can be co-extruded with the adhesive 108, which can bond the layer 110 and the adhesive 108. This can facilitate a reduction in thickness of the layer 110 required to adequately form a char layer in case of exposure to flame.

Figure 2:
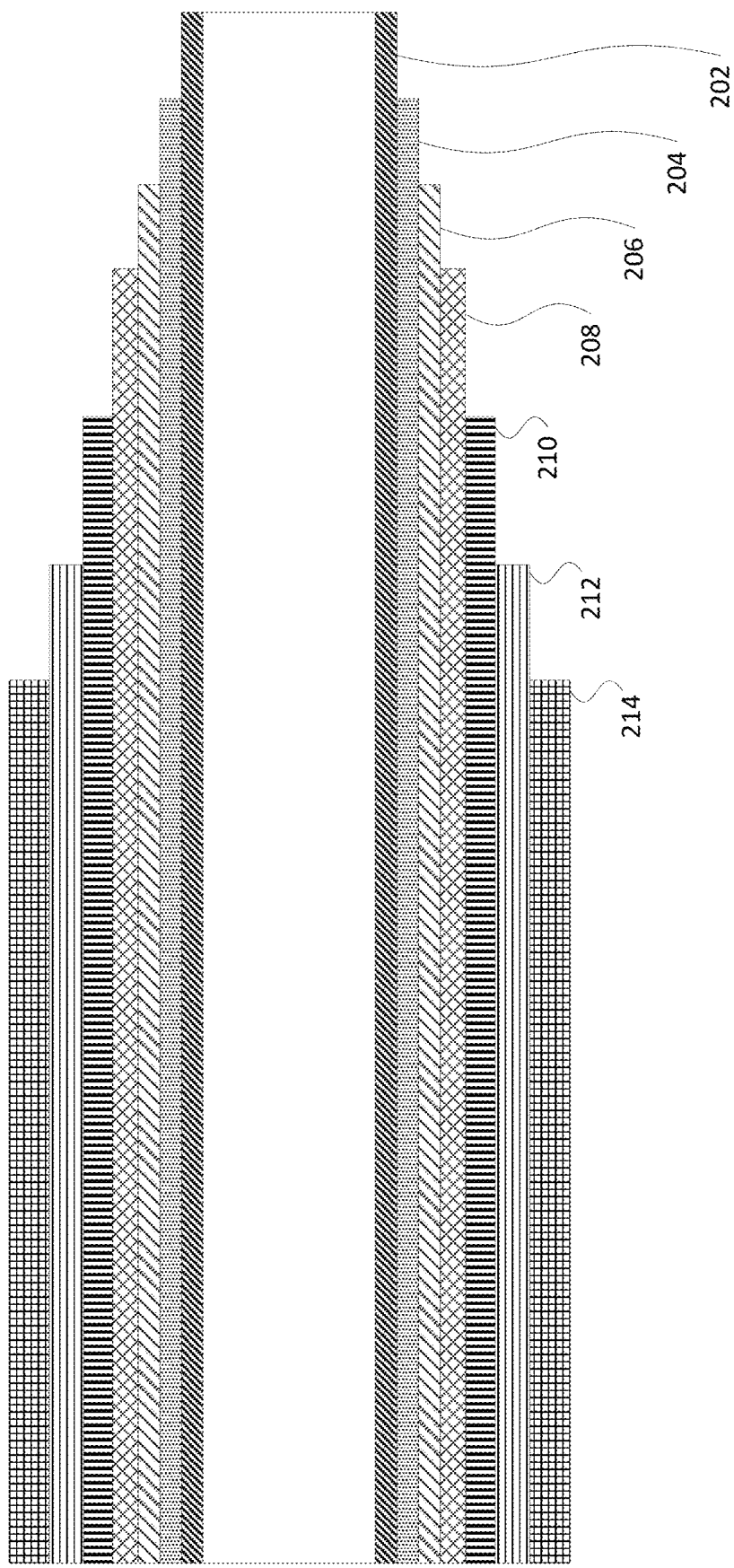

In some cases, an intermediate plastic layer can be located between the flame protective layer and the gas barrier. FIG. 2 depicts a composite tube according to embodiments of the claimed invention. The composite tube can include an inner plastic layer 202, an adhesive layer 204, a gas barrier 206, an adhesive layer 208, an intermediate plastic layer 210, an optional adhesive layer 212, and a flame protective layer 214. The inner plastic layer 202, adhesive layers 204, 208, and 212, gas barrier 206, and a flame protective layer 214 can be examples of inner plastic layer 102, adhesive layers 104 and 108, gas barrier 106, and flame protective layer 110 as described with reference to FIG. 1. The tube in FIG. 2 can also include the intermediate plastic layer 210, which can be made of materials similar to those which the inner plastic layer 102 of FIG. 1 is composed.

The intermediate plastic layer 210 can be located between the flame protective layer 214 and the gas barrier 206. The intermediate plastic layer 210 can further reduce thickness and tensile requirements of the flame protective layer 214. For example, the flame protective layer 214 may reduce the amount of plastic components within the layer 214 due to the location of the intermediate plastic layer 210.

Intermediate plastic layer 210 and flame protective layer 214 can be co-extruded such that the intermediate plastic layer 210 provides tensile strength and elasticity (e.g., with regard to bending) while the flame protective layer 214 is bonded to and protects the intermediate plastic layer 214. Even if the flame protective layer 214 cracks (e.g., at a bend) the exposed intermediate plastic layer will be relative small and foaming and charring of the flame protective layer 214 can shield and/or limit combustion of the intermediate plastic layer 210.

Embodiments of the invention can include multiple flame retardant layers, either adjacent or separate from each other. For example, a flame retardant layer can be included between layers 102 and 104, 104 and 106, 202 and 204, 204 and 206, and the like. In some cases, the flame protective material can also be included in layers 102 and 202.

Metal Deactivators

In some cases, the flame protective composite tube can include metal deactivators. For example, the adhesive layers (e.g., layers 104 and/or 108 of FIG. 1) can include the metal deactivators. The metal deactivators can enable use of high-magnesium content alloys in other layers of the composite tube (e.g., gas barrier 106 of FIG. 1), which can include increased mechanical performance compared to other alloy layers. For example, the metal deactivators can help reduce potential oxidation in the alloys (e.g., alloys having high magnesium content) and subsequent delamination. Examples of metal deactivators can include, but are not limited to, N,N'-bis(3,5-di-t-butyl-4-hydroxyphenylpropionyl)hydrazine, N,N'-diphenyloxamide, N-salicylal-N'-salicyloyl-hydrazine, N,N'-bis(salicyloyl)hydrazine, 3-salicyloylamino-1,2,4-triazole, bis(benzylidene)oxallyl dihydrazide, oxanilide, isophthaloyl dihydrazide, sebacoyl bisphenylhydrazide, N,N'-diacetyladipoyl dihydrazide, N,N'-bis(salicyloyl)oxallyl dihydrazide, N,N'-bis(salicyloyl) thiopropionyl dihydrazide, is also advantageously used in the composition. N,N'-bis(3,5-di-t-butyl-4-hydroxyphenylpropionyl)hydrazine (EVERNOX™ MD 1024), and the like.

Applications

The flame protective composite tubes described above can be used for a variety of applications. For example, the flame protective composite tubes can be used for common water conveyance applications. However, there are many other applications for which this type of tube can be used. These other applications could include the conveyance of other types of liquids and gases such as refrigerants, natural gas, propane, and process and medical gases such as argon, helium, nitrogen, and the like.

Figure 3:
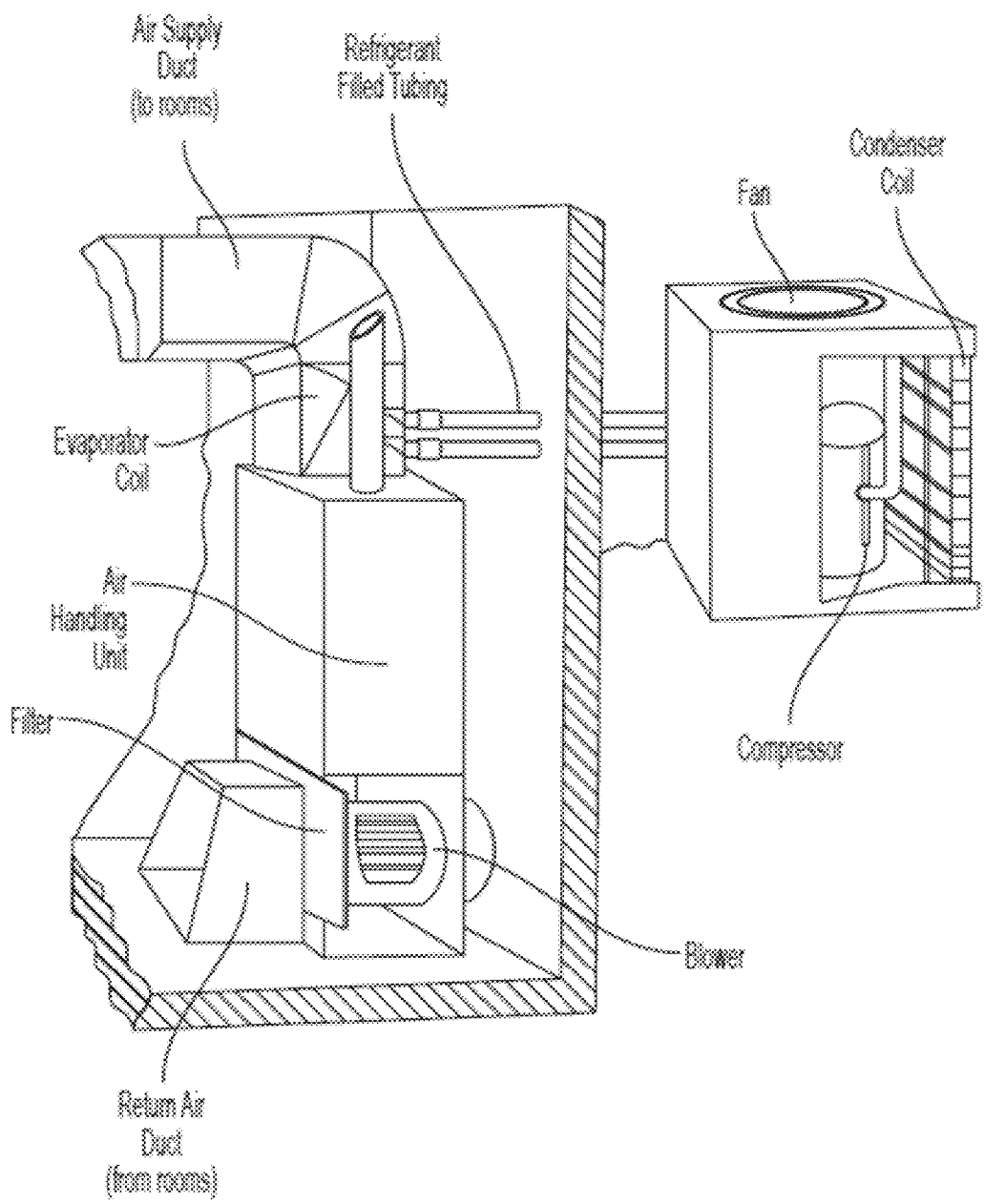
FIG. 3 depicts an air conditioning system that can implement a flame protective composite tube according to an embodiment of the invention.

FIG. 3 depicts a refrigeration system, specifically an air conditioning system. The refrigeration system can be configured to act as a heat pump that extracts heat from air surrounding the condenser coil and transfers that heat to the evaporator coil to heat a structure. Notably, operation as a heat pump generates higher refrigerant temperatures that soften plastic layers 102 and 110 and place increased tensile loads on gas barrier 106.

The refrigeration system can include a suction line and a return line. Either or both of the suction line and the return line can include the flame protective composite tubes described above.

In one embodiment, multilayer composite tubes can be utilized as line sets for a refrigeration or air conditioning system carrying a flammable (e.g., slightly flammable or highly flammable) refrigerant.

Refrigerants are listed by the American Society of Heating, Refrigeration, and Air Conditioning Engineers (ASHRAE) in ASHRAE Standard 34 (2019). The ASHRAE 34 Standard Committee determines toxicity and flammability classification. Class A refrigerants have lower toxicity. Class B refrigerants have higher toxicity. Flammability classifications are summarized in Table 6-1 of ASHRAE Standard 34. Embodiments of the invention can be utilized with A1, A2L, A2, A3, B1, B2L, B2, or B3 refrigerants.

A Class 2L refrigerant is understood according to ASHRAE Standard 34 (2019); specifically, under § 6.1.3.2 of ASHRAE Standard 34 (2019) a Class 2L refrigerant meets all four of the following conditions: (1) exhibits flame propagation when tested at 140° F. (60° C.) and 14.7 psia (101.3 kPa): (2) has an LFL>0.0062 lb/ft$^3$ (0.10 kg/m$^3$): (3) has a heat of combustion <8169 Btu/lb (19,000 kJ/kg): (4) has a maximum burning velocity of ≤3.9 in/s (10 cm/s) when tested at 73.4° F. (23.0° C.) and 14.7 psia (101.3 kPa) in dry air. A Class A refrigerant is understood according to ASHRAE Standard 34 § 6.1.2 (2019) as having an OEL (occupational exposure limit) of 400 ppm or greater.

Many of such refrigerants have a low global warming potential (GWP), e.g., a GWP of 500 or lower.

Exemplary refrigerants are listed in Table 2 below.

TABLE 2

| | Exemplary Refrigerants | |
|---|---|---|
| IUPAC name | Structure | ASHRAE Designation |
| | Hydrocarbons and dimethylether | |
| Ethane | $CH_3\text{—}CH_3$ | R-170 |
| Propene (propylene) | $CH_2\text{=}CH\text{—}CH_3$ | R-1270 |
| Propane | $CH_3\text{—}CH_2\text{—}CH_3$ | R-290 |

TABLE 2-continued

Exemplary Refrigerants

| IUPAC name | Structure | ASHRAE Designation |
|---|---|---|
| Methoxymethane (dimethylether) | $CH_3$—O—$CH_3$ | R-E170 |
| Cyclopropane | —$CH_2$—$CH_2$—$CH_2$— | R-C270 |
| Fluorinated alkanes (HFCs) | | |
| Fluoromethane | $CH_3F$ | R-41 |
| Difluoromethane | $CH_2F_2$ | R-32 |
| Fluoroethane | $CH_2F$—$CH_3$ | R-161 |
| 1,1-Difluoroethane | $CHF_2$—$CH_3$ | R-152a |
| 1,1,2,2-Tetrafluoroethane | $CHF_2$—$CHF_2$ | R-134 |
| Fluorinated alkenes (HFOs) and alkynes | | |
| Fluoroethene | $CHF=CH_2$ | R-1141 |
| 1,1,2-Trifluoroethene | $CF_2=CHF$ | R-1123 |
| 3,3,3-Trifluoroprop-1-yne | $CF_3$—C≡CH | NA |
| 2,3,3,3-Tetrafluoroprop-1-ene | $CH_2=CF$—$CF_3$ | R-1234yf |
| (E)-1,2-difluoroethene | $CHF=CHF$ | R-1132(E) |
| 3,3,3 -Trifluoroprop-1-ene | $CH_2=CH$—$CF_3$ | R-1243zf |
| 1,2-Difluoroprop-1-ene[§] | $CHF=CF$—$CH_3$ | R-1252ye[§] |
| (E)-1,3,3,3-tetrafluoroprop-1-ene | $CHF=CH$—$CF_3$ | R-1234ze(E) |
| (Z)-1,2,3,3,3-pentafluoro-prop-1-ene | $CHF=CF$—$CF_3$ | R-1225ye(Z) |
| 1-Fluoroprop-1-ene[§] | $CHF=CH$—$CH_3$ | R-1261ze[§] |
| R32/R1234 | Blend | R-454B |
| Fluorinated Oxygenates | | |
| Trifluoro(methoxy)methane | $CF_3$—O—$CH_3$ | R-E143a |
| 2,2,4,5-Tetrafluoro-1,3-dioxole | —O—$CF_2$—O—$CF=CF$— | NA |
| Fluorinated Nitrogen and Sulfur Compounds | | |
| N,N,1,1-tetrafluormethaneamine | $CHF_2$—$NF_2$ | NA |
| Difluoromethanethiol | $CHF_2$—SH | NA |
| Trifluoromethanethiol | $CF_3$—SH | NA |
| Inorganic Compounds | | |
| Carbon dioxide | $CO_2$ | R-744 |
| Ammonia | $NH_3$ | R-717 |
| Current HFCs and HCFCs | | |
| Pentafluoroethane | $CF_3$—$CHF_2$ | R-125 |
| R-32/125 (50.0/50.0) | Blend | R-410A |
| Chlorodifluoromethane | $CHClF_2$ | R-22 |
| 1,1,1,2-Tetrafluoroethane | $CF_3$—$CH_2F$ | R-134a |

Accordingly, embodiments of the invention can include both a system including one or more AC/refrigeration components (e.g., a compressor and/or an evaporator coil), a multilayer-composite-tube line set, and refrigerant (e.g., in the assembled system or in a container for charging the system after assembly) as well as a system including a multilayer-composite-tube line set and a container of refrigerant for charging an AC/refrigeration system after installation of the multilayer-composite-tube line set between the evaporator coil and the compressor.

The composite multi-layer tube can be configured to meet one or more applicable standards. For example, the composite multi-layer tube can be configured to have a flame and smoke spread rating of no more than 25/50 when tested in isolation (e.g., a pair consisting of a suction line and a return line as would be used in the field) using the ASTM E84-20 Standard Test Method for Surface Burning Characteristics of Building Materials and/or Appendix A1.22 of the CAN/ULC-S102-10 Standard Test Method for Surface Burning Characteristics of Building Materials and Assemblies. The composite multi-layer tube can be configured such that the aluminum layer remains intact after completion of one of these tests.

Reinforcement Layers

Depending on the application of the use for the flame protective composite tube, greater performance standards may be required, making it necessary to further enhance the standard multilayer product design to ensure higher pressure and temperature limits. This enhancement can be accomplished by adding yet another layer of material to the overall construction, thereby creating a reinforcement layer. Additionally or alternatively, the reinforcement can be added within the one of the layers described above.

The reinforcement can be constructed in several forms. For example, the reinforcement can be spirally (e.g., helically) wrapped, longitudinal, braided, and the like under, over, or within any of the layers. For example, a reinforcement layer can be around or within the inner layer of plastic 102, around or within the outer layer of plastic 110, around the gas (e.g., oxygen) barrier (e.g., metal) layer 106, or around or within the adhesive layers 104, 108. The reinforcement layer can completely cover or partially cover the surface of a tube layer 102, 104, 106, 108, 110.

The reinforcement material can include one or more individual material spirals wrapped around the tube (e.g., one material spirally wound with axial pitch of 0.25" or four spirals with individual pitch of 1" or 0.25" collectively). Tube capacity (e.g., in terms of burst strength) can be adjusted based on pitch, material selection, and the like. For example, the tubing can have a burst pressure in excess of 1,900 psi at 70° F. and 1,500 psi at 200° F.

The reinforcement can include one or more materials such as metal foils (e.g., aluminum or copper), plastic films, metal wire, plastic wire, fiberglass cords or fabric (e.g., AR-glass, C-glass, D-glass, E-glass, E-CR-glass, R-glass, S-glass, and the like), any type of filament material, aramids, para-aramids, poly-aramid synthetic fibers, aromatic polyester strands, and the like. The reinforcing materials can be coated (e.g., with a binder or primer), machined (e.g., roughened), etched, or otherwise treated to bond to or be embedded within the adhesive layers. In some cases, the reinforcement can be coated with a flame retardant so that the reinforcement layer provides flame protection. In some embodiments, a particular adhesive layer (e.g., a tie resin, a solvent-based adhesive, a hot-melt adhesive, and the like) is utilized to bond particular reinforcements.

In some embodiments, the reinforcement is applied after the product is extruded (e.g., a spiral wrap applied with a wrapping machine). In other embodiments, a spiral wrap is formed with a rotating extrusion crosshead such that the spiral material is extruded within a layer of polymer or adhesive (e.g., wire inside polymer). In still another embodiment, a spiral wrap is formed with a rotating extrusion crosshead (e.g., polyester cord extruded in a helix around an underlying tube). In still another embodiment, a longitudinal wrap can be added to any layer of the tube.

Method of Fabricating Flame Protective Composite Tube

Figure 4:
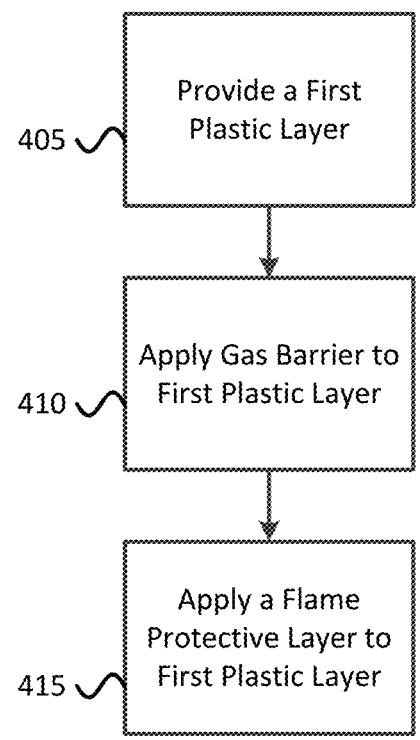
FIG. 4 depicts a workflow process for fabricating a flame protective composite tube according to an embodiment of the invention.

FIG. 4 depicts a process for fabricating a flame protective composite tube, according to an embodiment of the claimed invention.

At Step 405, a first plastic layer can be provided. In some cases, the first plastic layer can be a resin layer formed via extrusion.

At Step 410, a gas barrier layer can be applied to the exterior of the first plastic layer. The gas barrier layer can be applied to the exterior of the first plastic layer by a variety of techniques. In some cases, the gas barrier layer can be a resin layer applied to the tubing by extrusion. The gas barrier layer can be a foil, laminated foil, tape or wire layer or the like and can be wound onto the tubing. A foil, laminated foil, tape or wire can be wrapped around the first plastic layer through a number of methods, including helically and radially wrapping.

At Step 415, a flame protective layer can be applied to the exterior of the gas barrier layer and the first plastic layer. The flame protective layer can be a resin layer applied to the first plastic layer by extrusion. In this case, the components of the flame protective layer (e.g., plastic components and flame resistant materials) can be components of the resin as well.

In some cases, an adhesive (e.g., a conductive adhesive, a non-conductive adhesive, etc.) can be used to secure the gas barrier to the first plastic layer. Further, in some cases, an adhesive (e.g., a conductive or non-conductive adhesive) can be used to secure the flame protective layer to the gas barrier layer.

In some cases in which the first plastic layer and the flame protective layer are both resin layers, Steps 410 and 420 can be carried out simultaneously through co-extrusion.

Compression Fitting

Figure 5A:
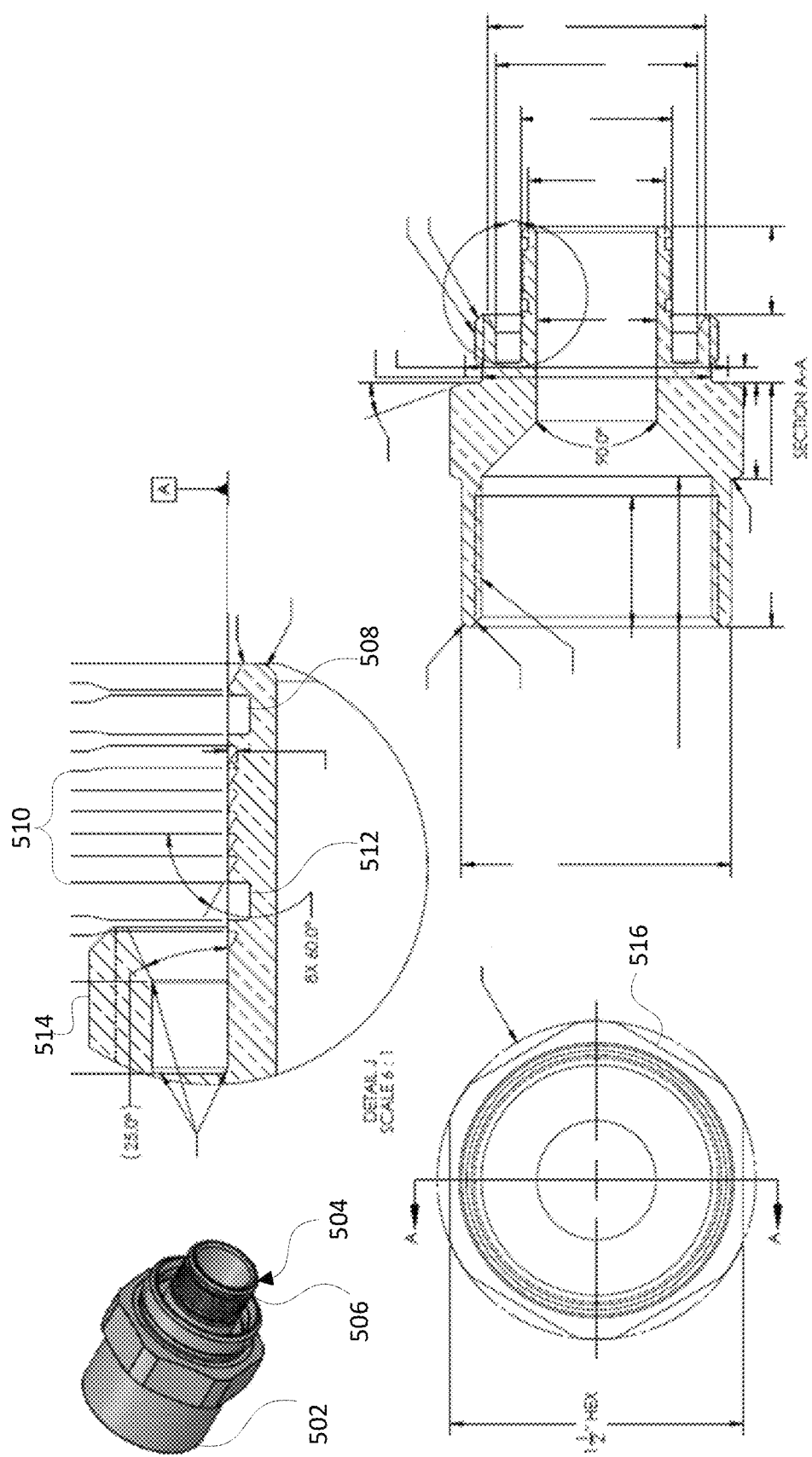
FIGS. 5A-5C depict a compression fitting according to an embodiment of the invention.
Figure 5B:
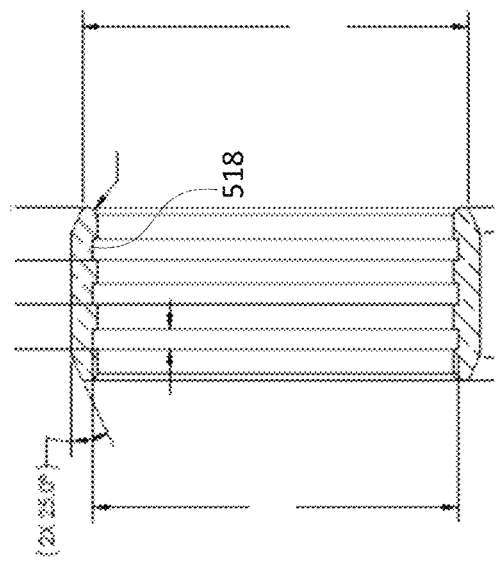
Figure 5B:
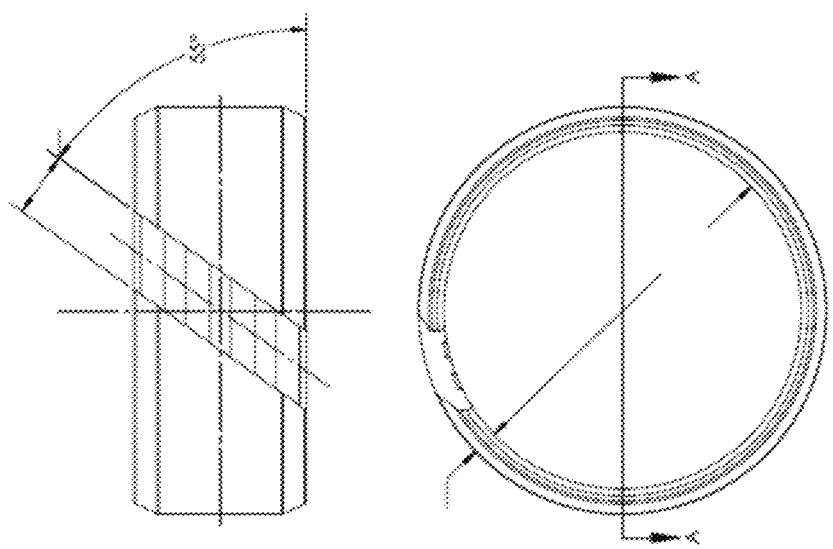
Figure 5B:
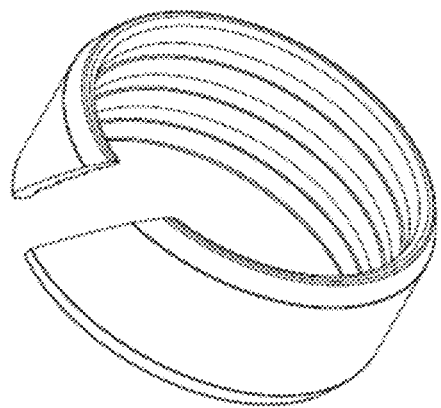
Figure 5C:
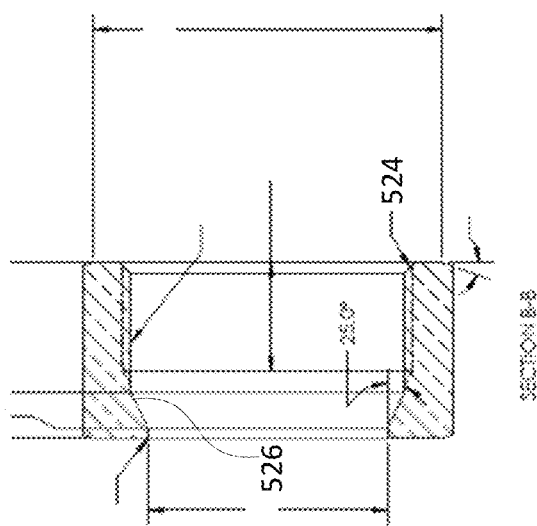
Figure 5C:
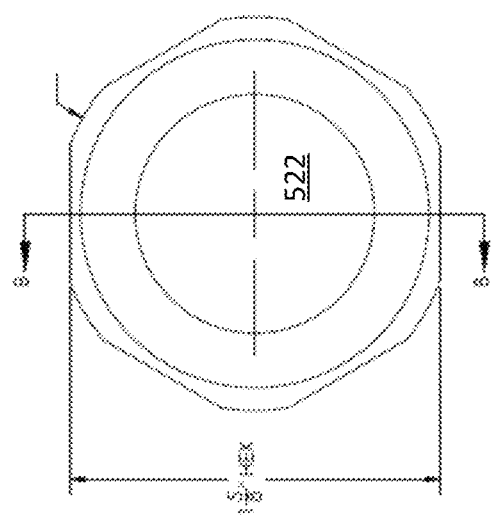
Figure 5C:
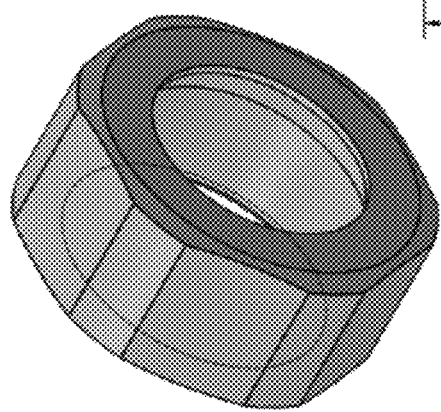

Referring now to FIG. 5A-5C, another aspect of the invention provides a compression fitting 500. Compression fitting 500 advantageously seals ends of the composite tubes described herein and resists leaks and blow-off when subject to pressures commonly found in refrigeration systems (e.g., between about 200 psi and about 300 psi, between about 300 psi and about 400 psi, and the like).

Proximal end 502 of compression fitting is designed to be coupled a refrigeration system component (e.g., compressor or evaporator coil). Proximal end 502 can include threads to couple with complementary threads on the refrigeration system component, which can be standardized across equipment. In some embodiments, the proximal end 502 can be coupled to the refrigeration system component using brazing or another non-threaded coupling technique. The proximal end 502 can be coupled to the refrigeration system component before the composite tubing is attached to the distal end 504.

The distal end 504 can include a nipple 506 including a distal annular channel 508, one or more medial barbs 510 (e.g., annular barbs), a proximal annular channel 512, and first threaded region 514. The nipple 506 can be sized to allow an inner diameter of a corresponding composite tube to slide snugly over the nipple 506 (e.g., without the need for tools and without kinking of the composite tube during pushing).

Compression fitting 500 can also include wrench flats 516 that can be used to attach the compression fitting 500 to the refrigeration system component and/or hold back when tightening other components relative to the first threaded region 514.

Referring now to FIG. 5B, the compression fitting can further include a ferrule 516 adapted and configured to fit over an outer diameter of the composite tubing and the nipple 506. The ferrule 516 can include one or more internal annular grooves 518. The grooves 518 can be positioned to align with one or more O-rings received within distal annular channel 508 and/or a proximal annular channel 512 and/or medial barbs 510.

Referring now to FIG. 5C, a nut 520 can be placed over an end of composite tube via axial bore 522 (followed by ferrule 516 before an end of the composite tube is slid over the nipple 506). A second threaded region 524 on nut 520 can then engage with the first threaded region 514. An internal geometry (e.g., sloped shoulder 526) of the nut 520 can be configured to apply compression (e.g., axial and/or radial) to the ferrule 516 when the nut 520 is threaded proximally relative to the nipple 506.

Fitting 500 can be fabricated from a material such as a metal (e.g., brass) through various techniques including machining, casting, and the like.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A refrigeration system comprising:
   a compressor;
   an evaporator coil;
   a composite refrigeration line set coupled between the compressor and the evaporator coil to form a fluid circuit between the compressor and the evaporator coil, the composite refrigeration line set comprising:
   a suction line; and
   a return line;
   characterized in that one or more of the suction line and the return line are a composite refrigeration line set tube comprising:

an inner plastic tube;
a first adhesive layer external to the inner plastic tube;
an aluminum layer circumferentially surrounding the first adhesive layer and coupled to the inner plastic tube via the first adhesive layer;
a second adhesive layer external to the aluminum layer; and
an outer plastic layer circumferentially surrounding the aluminum layer and coupled to the aluminum layer via the second adhesive layer;
wherein:
 the inner plastic tube is polyethylene of raised temperature;
 the outer plastic layer is polyethylene of raised temperature; and
 the outer plastic layer comprises at least one a flame-resistant compound combined with the polyethylene of raised temperature, wherein the at least one flame-resistant compound includes one or more selected from the group consisting of: glass fibers, nanoclay, nanofibers, a thermal foaming agent, and a combination thereof;
 the aluminum layer has one or more properties selected from the group consisting of:
  being an alloy having 0.1% or greater magnesium by mass; and
  being an alloy selected from the group consisting of: AL 3004, AL 3005, AL 5052, AL 6061, and AL 8006; and
 the composite refrigeration line set tube has a burst pressure in excess of 1950 pounds per square inch; and; and
wherein the composite refrigeration line set tube has a flame and smoke spread rating of no more than 25/50 when tested in isolation using Appendix A1.22 of the CAN/ULC-S102-10 Standard Test Method for Surface Burning Characteristics of Building Materials and Assemblies; and
a refrigerant received within the fluid circuit;
wherein the refrigerant is an A2L refrigerant defined as:
 (i) exhibiting flame propagation when tested at 140° F. and 14.7 psia;
 (ii) having a lower flammability limit (LFL) >0.0062 lb/ft3;
 (iii) having a heat of combustion <8169 Btu/lb; and
 (iv) having a maximum burning velocity ≤3.9 in/s when tested at 73.4° F. and 14.7 psia in dry air.

2. The refrigeration system of claim 1, wherein at least the aluminum layer remains intact after completion of the CAN/ULC-S102-10 Standard Test Method for Surface Burning Characteristics of Building Materials and Assemblies.

3. The refrigeration system of claim 1, wherein the at least one flame-resistant compound is a thermal foaming agent.

4. The refrigeration system of claim 1, wherein the at least flame-resistant compound has a specific gravity of greater than 1.5 with respect to the outer plastic layer.

5. The refrigeration system of claim 1, wherein the outer plastic layer is composed of at least 50% by weight of the flame-resistant compound.

6. The refrigeration system of claim 1, wherein the outer plastic layer is composed of at least 90% by weight of the flame-resistant compound.

7. The refrigeration system of claim 1, wherein the at least one flame-resistant compound comprises magnesium hydroxide.

8. The refrigeration system of claim 1, wherein the refrigerant is selected from the group consisting of: difluoromethane, 2,3,3,3-tetrafluoroprop-1-ene, (E) 1,3,3,3-tetrafluoroprop-1-ene, R32/R1234, and ammonia.

9. The refrigeration system of claim 1, wherein the refrigerant comprises difluoromethane.

10. The refrigeration system of claim 1, wherein the refrigerant is R-32.

11. The refrigeration system of claim 1, wherein the refrigerant is R-454B.

12. The refrigeration system of claim 1, wherein the refrigerant is a low-global-warming-potential refrigerant.

13. The refrigeration system of claim 1, wherein the alloy is selected from the group consisting of: AL 3005 and AL 3105.

14. The refrigeration system of claim 1, wherein the alloy is selected from the group consisting of: AL 3004 and AL 5052.

15. The refrigeration system of claim 1, wherein the alloy has between 0.15% and 0.8% magnesium by mass.

* * * * *